Jan. 12, 1954
L. W. SHAHAN
2,665,513
ARTIFICIAL FISH LURE
Filed Oct. 14, 1948
2 Sheets-Sheet 1
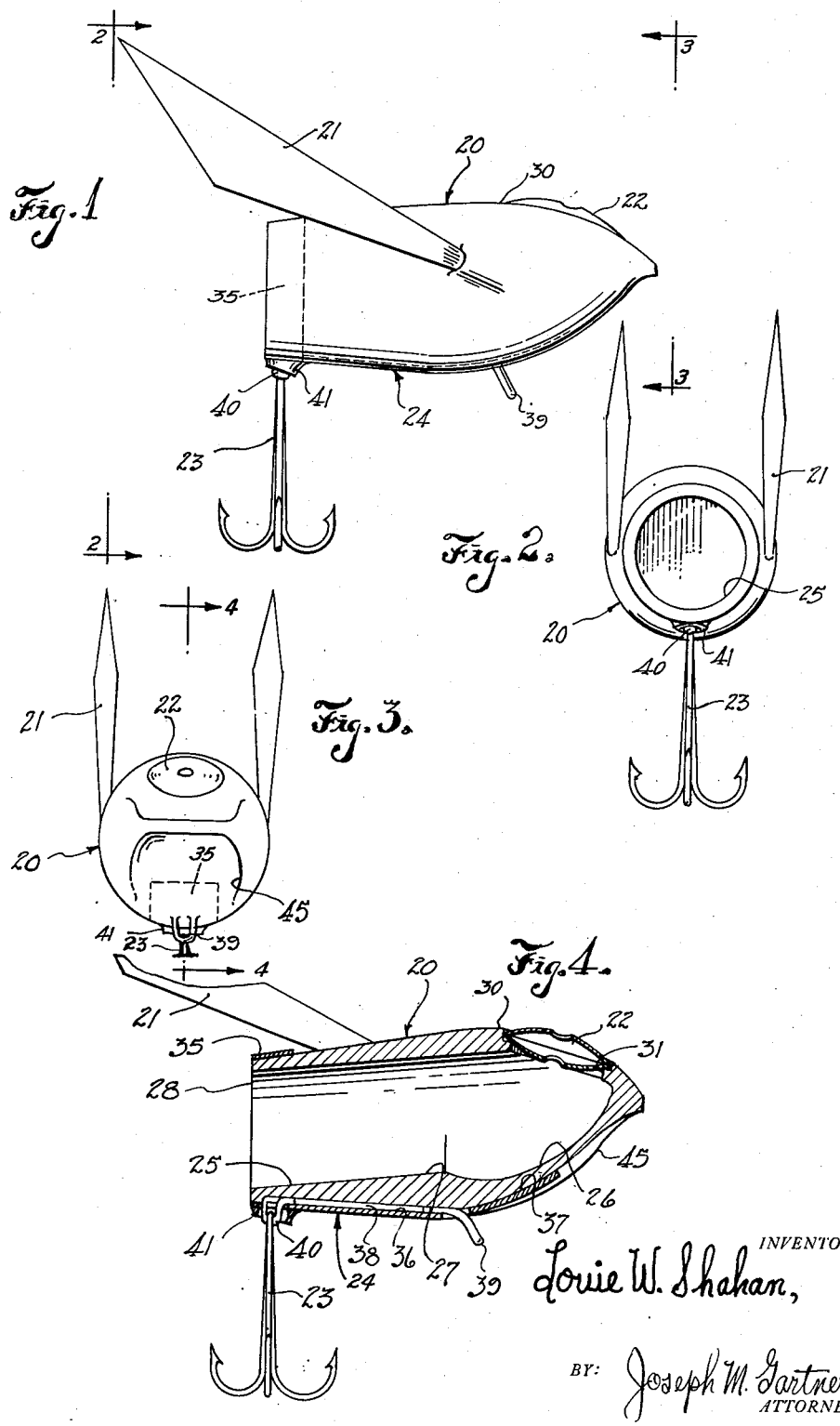
INVENTOR:
Louie W. Shahan,
BY: Joseph M. Gartner,
ATTORNEY Jan. 12, 1954

L. W. SHAHAN 2,665,513

ARTIFICIAL FISH LURE

Filed Oct. 14, 1948

INVENTOR.
Louie W. Shahan,
BY Joseph M. Gartner,
ATTORNEY.

Patented Jan. 12, 1954

2,665,513

UNITED STATES PATENT OFFICE 2,665,513

ARTIFICIAL FISH LURE

Louie W. Shahan, Selma, Ala.

Application October 14, 1948, Serial No. 54,429

6 Claims. (Cl. 43—42.06)

This invention relates in general to artificial fish lures and is particularly concerned with new and useful improvements in artificial fish lures particularly characterized as having means capable of making audible sounds which produce vibrations attractive to fish.

Although it is generally believed that fish do not have auditory organs and, therefore, do not hear audible sounds familiar to other animals of nature, nevertheless, it is a matter of common observation by skilled fishermen that fish are affected by audible sounds which produce vibrations capable of being transmitted through the water which, to other animals of nature and humans, are of audible frequency.

Ordinarily, fishermen have endeavored to avoid all noise on the theory that any noise or unfamiliar sounds would frighten the fish and cause them to flee from the zone.

In the present invention, however, the artificial fish lure is provided with means to cause various sounds which are transmitted into vibrations attractive to fish. These vibrations produce a startling and unexpected effect on fish, and attract the attention of the fish. If the fish's attention is attracted, it has been found that they strike harder and more forcefully. Accordingly, the artificial fish lure contemplated by this invention results in more frequent and more thrilling strikes. It is notable that the number of catches are increased since the harder the strike the more securely the hook is embedded in the fish.

Accordingly, a principal object and accomplishment of the invention is to provide an artificial fish lure in which the fluid or water passing thereinto and therefrom will cause air activity which, in the exhaust and intake thereof, creates various audible sounds including a whistling sound and also a gurgling and thumping sound, when the lure is passed through various maneuvers caused by the jerking of the line, the audible sounds produced are intermittent depending upon the action of the lure and are positive in response to the action of the lure in the water.

A further object of my invention is to produce a fish lure that is buoyant and having hollow portions adaptable to become respectively filled with water and exhausted of water during its various maneuvers in the water, thereby causing desirable disturbance and activity of the water surrounding the lure which is attractive to fish.

A further object and accomplishment of my invention is to provide a fish lure having improved support means for the fish hooks, the support means being designed to eliminate all tentional strains on the lure body, thereby increasing the life span of the lure.

Another object of the invention is to provide a fish lure that is buoyant and is provided with hollow portions wherein air is forced out by the movement of the water entering and exhausting the hollow portion, and also wherein air is forced into the hollow portions by the movement of water receding from the hollow portions and in which the air is being exhausted and inhaled, thereby to produce sound waves, preferably a whistling sound emanating from the lure proper and gurgling sounds caused by the lure's action in providing activity and disturbance in the surrounding water, these various sound waves causing vibrations which attract the attention of the fish to the lure.

In its subordinate features, this invention provides an artificial fish lure of the plug type of a novel design which will perform erratic movements in the water when drawn therethrough, thus simulating the action of a small fish or minnows or rodents attractive to fish.

Another object of my invention is to provide an artificial fish lure adaptable for all types of casting such as, for example, slip casting, bait casting, fly casting, etc.

The invention seeks, as a further object and accomplishment to provide improvements in artificial fish lures as contemplated herein and characterized by an arrangement of parts to more advantageously and satisfactorily perform the function required of it and adapted to provide a compact unit which will successfully combine the features of structural simplicity and durability and yet be economical to manufacture.

Additional objects, features, and advantages of the invention disclosed herein will be apparent to persons skilled in the art after the construction and operation are understood from the within description.

It is preferred to accomplish the various objects of this invention and to practice the same in substantially the same manner hereinafter fully described and as more particularly pointed out in the appended claims, reference being had to the accompanying drawings which form a part of this specification, wherein:

Fig. 1 is a side elevational view of an artificial fish lure of the plug type embodying the features of this invention; this view showing the various parts in assembled association and with a finish coating of paint applied to the exterior surface of the lure;

Fig. 2 is a rear elevational view of the artificial fish lure depicted in Fig. 1 and being taken substantially on the plane of the line 2—2 in Fig. 1;

Fig. 3 is a front elevational view of the fish lure depicted in Fig. 1 and being taken substantially on the plane of the line 3—3 in Fig. 1;

Fig. 4 is a side sectional view of the fish lure depicted in Fig. 1, this view having portions thereof in section to more clearly illustrate the internal construction of the lure; this view showing the various parts in assembled association but before the finish coating of paint is applied to the exterior surface of the lure;

Figure 5:
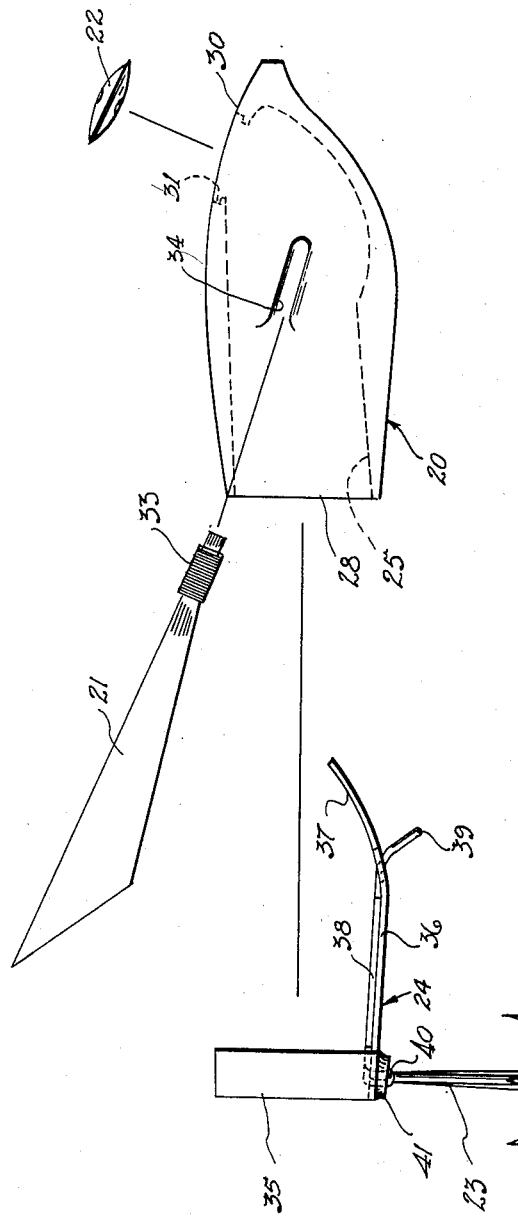
Figure 6:
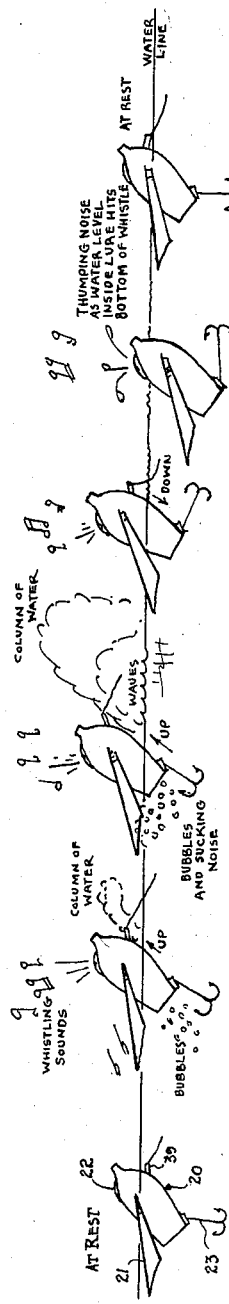

Fig. 5 is an exploded view of the fish lure depicted in Fig. 1 to more clearly illustrate component parts of the fish lure and their relative association each with the other before the finish coating of paint is applied to the exterior surface of the lure; and Fig. 6 is a diagrammatical illustration of the action of the fish lure depicted in Fig. 1 when passing through its various maneuvers to advantageously accomplish its various functions in the attraction of fish.

The drawings are to be understood as being more or less of a schematic character for the purpose of illustrating and disclosing a typical or preferred form of the improvements contemplated herein and in the drawings like reference characters identify the same parts in the several views.

In the exemplary embodiment of the invention depicted in Figs. 1, 2, and 3, the artificial fish lure contemplated herein comprises, in general, a bulbular body 20 preferably made of a buoyant material such as, for examples, cork, plastic wood, plastics, or any other suitable material having like characteristics, said bulbular body 20 being provided with hackle, deer hair, or the like 21 disposed on each side thereof, a sound making device 22 disposed in the forward upward portions of the body and adapted to make a whistling sound in various maneuvers of the fish lure which will be described more in detail as the description proceeds, and a fish hook 23 including an improved support therefor 24 disposed in the rearwardly and underside of the bulbular body 20.

Referring to Fig. 4, it can be seen that the bulbular body 20 is provided with a hollowed portion 25 extending longitudinally of the bulbular body 20 and having a slightly larger bore in the head of the lure as at 26 and thereafter a narrower bore in the shoulder portion of the lure as at 27 and thereafter widening out as it approaches the tail or end of the opening as at 28. This construction as employed has been proven advantageous because it permits water to fall fast or swiftly out of the lure when the line is jerked. It also acts on the principle of a plumber's friend and allows the water to re-enter the chamber 25 very quickly.

It is notable that the bulbular body 20 of the lure may be made in any conventional size, large or small, but retaining its general shape. In some adaptations, it may be advantageous to lengthen slightly the bulbular body 20 to permit the attachment of another hook under the belly of the lure, thereby to provide a lure having two hooks.

Within the crowning area 30 of the bulbular body 20 there is provided a circular countersunk opening 31 adaptable to receive a whistling element 22 communicative with the chamber 25, so that air compressed within the latter under water pressure admitted through the open end 28 will cause the whistle element 22 to sound during several of many possible maneuvers illustrated in Fig. 6 to be hereinafter described in detail. The whistle element 22 may be secured into its operative position in the countersunk opening 31 by any conventional means such as, for example, gluing or press fitting.

The feathers, hackle, deer hair and the like as at 21 may be disposed on each side of the bulbular body 20. It has been found advantageous to wrap twine 33 around one end of a cluster of feathers or hair and then dip it into glue or cement and thereafter insert that end into a grove 34 disposed in the side of the bulbular body 20. This end is then sealed into the body 20 by covering the grove with cork dust mixed with glue or cement to provide a smooth finished surface. Preferably, the other end of the hackle hair or deer hair is left free so that it may flare out in use.

It is notable that the lures may be painted or coated in various colors and eyes may be painted on the surface thereof or artificial eyes may be inserted at each side of the forward end of the bulbular body 20, if so desired.

An important feature of my invention is the provision of an improved hook support structure to provide the fisherman with a direct pull to the attached fish, thereby easing the strain on the body of the lure. Referring to Figs. 4 and 5, it can be seen that the hook support comprises a circular member 35 adaptable to receive and be retained by the rear end portions of the bulbular body 20, said circular member having secured thereto at the lower portions thereof a horizontally projecting leg or plate 36 extending forwardly and upwardly as at 37, said leg being adaptable to be secured on the lower portions of the bulbular body 20 as shown in Fig. 4. Secured to the leg 36 by soldering or the like, there is provided a bent wire 38 defining an eye 39 at the forward end, said eye 39 being adaptable to have secured thereto the conventional fisherman's line, and the end of the wire 38 opposite to the eye 39 is provided with an eye 40 adaptable to have secured thereto the fish hook 23. In order to balance the fish lure, I may, in some cases, provide a lead socket 41 around the eye, thereby to stabilize or balance the lure and also provide added weight, if necessary.

It is notable that the shape of the eyelet 40 is such that points of the hook 23 cannot touch or scratch the lure and so that the hooks are able to assume a position straight behind the body 20 on a line substantially parallel to the lure body but the angular position of the hook 23 should stop on that parallel line, and not get up into the rear air chamber opening 28 which may permit an attacking fish to miss the hooks while in that position.

According to the construction of the present invention, the hook support 24 is attached to the bulbular body 20 by gluing or some other convenient means to provide a smooth surface upon which paint will adhere in the various colors conventionally employed for fish lures of this character. Moreover, the hooks as at 23 may be attached as a single hook, as illustrated, or may be double or triple, to comply with the purchaser's demands and also to comply with State laws on fishing tackle. It is notable that where multiple hooks are to be provided these hooks are attached in the same manner hereinbefore described with respect to the attachment of a single hook.

In reviewing the drawings it can be seen that the fish lure contemplated herein comprises a bulbular body 20 of greater length than width and having a tapered front end and a tapered rear end, the central portion of the body having greater cross-sectional area than the ends, a portion of the surface of the said front end being curved, a circular member defining a ring 35 having an inside circumference slightly greater than the outer circumference of the rear end of the body, a leg 36 projecting from said ring and having at the free end thereof a surface corresponding in contour to said curved surface at the front end of the body, and the said projecting leg 36 and ring 35 having attached thereto a line and a hook securing means respectively indicated at 39 and 40.

Referring to Fig. 6 which illustrates diagrammatically various maneuvers of the fish lure in its operation in the water, it will be found that the artificial fish lure is buoyant and normally rests on the surface of the water with the conventional fisherman's line attached in place to the eye 39 disposed at the throat of the lure. The crowning portion 30 of the lure containing the whistle element 22 is normally disposed above the water line, while the balance of the lure is under the water line or surface and the air tunnel or chamber 25 is normally substantially filled with water.

When the fisherman's line attached to the lure is jerked, the lure rises upwardly and forwardly, thereby displacing the water in the chamber or air tunnel 25 by air that will enter the air chamber through the whistling element 22, thereby causing the whistle to sound or make an audible noise. Pressure or jerk released on the fisherman's line will permit the lure to settle down slightly backwards into the water thereby causing the water to re-enter the chamber 25 and force the air out of the chamber through the whistle element 22 which will cause the whistle to sound again, thus there will be at least two audible sounds or whistles with each jerk of the fisherman's line.

It is important to understand that, in addition to the audible sounds produced by the lure, further desirable activity of the water takes place at each time the lure is jerked and moved forwardly and upwardly because the particular design and shape of the throat of the lure will force a wall or column of water to rise in front of the lure which causes activity in the water such as, for example, ripples and waves and a splashing sound as the water is disturbed. Moreover, the hereinbefore described movements of the lure will cause sucking and bubbling noises at the rear of the lure and more waves and ripples as water is entering or leaving the chamber 25 of the lure.

It is important to understand that when the lure settles back into the water, after the jerk or intermittent jerking, water entering the chamber 25 of the lure body spanks up against the whistle element's bottom which will cause a knocking or thumping sound, also any water that may become inside the whistle element 22 in the lure's various movements will be blown out as vapor or droplets when the lure settles back into the water.

In all the lure's movements on the surface of the water waves and ripples occur and the hissing, bubbling, thumping, splashing, sucking, whistling noises and squeaks send sound waves or vibrations through the water attracting the attention of the fish.

It has been found that different or varying tones of the whistling element 22 may be obtained by the pressure or force of the jerks on the fisherman's line. With experience, the whistling sounds may be made to imitate sounds of animals, rodents, insects, birds, and other living forms or objects of nature, these varying sounds having been proven to be attractive to the fish. Moreover, the jerks on the fisherman's line may be intermittent or single according to the mood of the angler.

The lure contemplated by this invention works equally as well in all weather and water conditions. The lure does not normally rise completely above the surface of the water and never submerges below the surface of the water. It is notable that the flanged throat 45 of the lure will cause the lure, when in motion, to ride up-right in all weather and water conditions. When the lure is retrieved swiftly, the flanged portions 45 cause the lure to skim along on the surface of the water like a boat and if the water is rough and the lure is traveling swiftly, it will leap from wave crest to wave crest, resembling minnows trying to escape from attacking fish.

In calm weather, when the lure is retrieved swiftly, it will skim along on the top of the water with the flanged portions 45 spliting the surface of the water and sending sprays of water on each side of the forward or head portions of the lure. Quick retrieves are desirable at certain times; however, it is not claimed that the whistle will sound when the lure is employed in this manner.

A particular advantage of the present lure is that it is so designed that it can be fished from high banks or bridges or straight underneath the angler employing it.

It is notable that the construction of the contemplated fish lure is easily adaptable to mass-production manufacture, thereby creating substantial savings in manufacturing cost.

From the foregoing disclosure, it may be observed that I have provided an improved artificial fish lure which efficiently fulfills the objects thereof as hereinbefore set forth and which provides numerous advantages which may be summarized as follows:

1. Structurally simple, efficient, and durable;
2. Economical to manufacture and readily adaptable to mass-production manufacturing principles;
3. The provision of an artificial fish lure having incorporated in the construction thereof means to provide audible sounds attractive to fish and further providing an improved fish hook supporting structure whereby the fisherman's line is given a direct pull through the supporting structure to the hook having an attached fish, thereby easing the strain on the body of the lure.

While I have illustrated a preferred embodiment of my invention, many modifications may be made without departing from the spirit of the invention and I do not wish to be limited to the precise details of construction set forth, but wish to avail myself of all changes within the scope of the appended claims.

I claim:

1. A fish lure comprising a bulbular buoyant body having interiorly thereof a relatively large chamber open at one end and closed at the opposite end permitting water to enter and recede from the chamber through the open end thereof, said body being tapered in each direction from the central regions thereof to define a tail end and a head end, said head end having a concaved portion formed to define a flanged throat at the underside side of the body and extending rearwardly to substantially the central regions of the body, said body when at rest assuming an angular position in the water permitting water to enter the open end to partially fill the chamber and the crowning area of the head being normally disposed above the water line; and a fish hook support comprising a circular member surrounding the periphery of the body adjacent the rear end portions thereof and having a leg extending forwardly at the underside of the body with a hook eye disposed at the terminal point of said circular member and said leg and including a fish line eye disposed at the forward end of the leg adjacent the central regions of the underside of the body.

2. In a fish lure, the combination with a hollow bulbular buoyant body formed to define a tail end and a head end with a concaved portion formed to define a concave flanged throat at the underside side of the body and extending rearwardly to substantially the central regions of the body, of a fish hook support comprising a circular support member surrounding the periphery of the tail end portion of the body, a leg extending forwardly from said circular support at the under side of the body into said throat, a hook eye disposed at the junction of said circular member and said leg, and a fish line eye disposed in the forward regions of said leg adjacent the central regions of the underside of the body, said eyes being interconnected to provide a direct pull to an attached fish, thereby easing the strain on the body of the lure.

3. In a fish lure, the combination with an elongated body tapering toward the ends and having a hollowed portion therein extending rearwardly from a crown at the forward end of the body and terminating in a relatively large opening defined by relatively thin walls of the body adjacent the rear end thereof, of a fish hook support comprising a ring support member surrounding the periphery of the body adjacent the rear end portions thereof and having a leg extending forwardly and of the same contour as the underside of the body, and a wire member having a hook eye formed at one end thereof at the junction of said ring support member and said leg and extending forwardly from said junction through said leg and having a fish line eye in its opposite end adjacent the central portion of the underside of the body.

4. In a fish lure having an elongated body tapering toward the ends and having a hollowed portion therein extending rearwardly from a crown at the forward end of the body and terminating in a relatively large opening defined by the relatively thin walls of the body adjacent the rear end thereof, a fish hook support comprising a circular support member surrounding the periphery of the body adjacent the rear end portions thereof and having a leg extending forwardly from said circular member at the underside of the body with a hook eye disposed at the terminal point of said circular support member and said leg and including a fish line eye projecting through said leg adjacent the central regions of the underside of the body.

5. A fish lure comprising a bulbular buoyant body and a fish hook support comprising a circular support member surrounding the periphery of the body adjacent the rear end portions thereof and having a leg extending forwardly from said circular member at the underside of the body with a hook eye disposed at the terminal point of said circular support member and said leg and including a fish line eye projecting through said leg adjacent the central regions of the underside of the body.

6. A fish lure comprising a bulbular body of greater length than width and having a tapered front end and a tapered rear end, the central portion of the body having greater cross-sectional area than the ends, a portion of the surface of the said front end being curved, a circular member defining a ring having an inside circumference slightly greater than the outer circumference of the rear end of the body, a leg projecting from said ring and having at the free end thereof a surface corresponding in contour to said curved surface at the front end of the body, and the said projecting plate and ring having a line and a hook securing means attached thereto.

LOUIE W. SHAHAN.

References Cited in the file of this patent
UNITED STATES PATENTS

| Number | Name | Date |
|---|---|---|
| 980,667 | Owen | Jan. 3, 1911 |
| 1,776,090 | Shroyer | Sept. 16, 1930 |
| 1,791,316 | Jordan | Feb. 3, 1931 |
| 1,832,172 | Winter | Nov. 17, 1931 |
| 1,929,150 | Peckinpaugh | Oct. 3, 1933 |
| 1,999,522 | Van Houten | Apr. 30, 1935 |
| 2,172,889 | Niemi | Sept. 12, 1939 |
| 2,204,552 | Singleton | June 13, 1940 |
| 2,262,974 | Steiner | Nov. 18, 1941 |
| 2,270,487 | Withey | Jan. 20, 1942 |
| 2,305,865 | Goyings | Dec. 22, 1942 |
| 2,589,970 | Shahan | Mar. 18, 1952 |